United States Patent
Kanzow et al.

(10) Patent No.: US 7,946,940 B2
(45) Date of Patent: May 24, 2011

(54) DRIVE BELT

(75) Inventors: Henning Kanzow, Hannover (DE);
Claus-Lueder Mahnken, Ahausen (DE); Reinhard Teves, Hannover (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 1140 days.

(21) Appl. No.: 11/704,308

(22) Filed: Feb. 9, 2007

(65) Prior Publication Data
US 2007/0191163 A1    Aug. 16, 2007

(30) Foreign Application Priority Data
Feb. 10, 2006    (EP) .................................. 06002704

(51) Int. Cl.
*F16G 1/28* (2006.01)
*F16G 5/20* (2006.01)

(52) U.S. Cl. ............... 474/205; 474/202; 428/292.1

(58) Field of Classification Search .................. None
See application file for complete search history.

(56) References Cited

U.S. PATENT DOCUMENTS

| | | | | |
|---|---|---|---|---|
| 4,486,375 | A * | 12/1984 | Hirai | 264/254 |
| 6,175,712 | B1 * | 1/2001 | Masuda et al. | 399/302 |
| 6,419,775 | B1 | 7/2002 | Gibson et al. | |
| 6,964,626 | B1 | 11/2005 | Wu et al. | |
| 2006/0264289 | A1 | 11/2006 | Ballhausen et al. | |

FOREIGN PATENT DOCUMENTS

| | | |
|---|---|---|
| DE | 101 08 165 | 1/2003 |
| EP | 0 662 571 | 7/1995 |

* cited by examiner

*Primary Examiner* — D. Lawrence Tarazano
*Assistant Examiner* — Camie S Thompson
(74) *Attorney, Agent, or Firm* — Walter Ottesen

(57) ABSTRACT

The invention is directed to a drive belt of rubber or rubber-like plastic having a surface protection (5) which includes polyamide-containing textile reinforcement and/or polyester-containing textile reinforcement. On the outer side, a surface coating (6) of a friction-reducing material in a matrix of at least one elastic addition polymer is provided. For improved heat resistance with good protection against wear, the elastic addition polymer has less than 2% by weight based on the polymer of structural components —O—$C_xR_y$—O— with x=1-3 and y=0-6. The R in a structural component can be the same or can be different and is selected from hydrogen and/or carbon-containing groups.

14 Claims, 1 Drawing Sheet

DRIVE BELT

CROSS REFERENCE TO RELATED APPLICATION

This application claims priority of European patent application 06002704.2, filed Feb. 10, 2006, the entire content of which is incorporated herein by reference.

FIELD OF THE INVENTION

The invention relates to drive belts of rubber or rubber-like plastic having, at a surface thereof, protective textile reinforcement comprising polyamide and/or polyester and having, on the outer side of such reinforcement, a layer of friction-reducing material in a matrix of at least one elastic addition polymer.

BACKGROUND OF THE INVENTION

Polyamide and/or polyester textile reinforcements can be used as surface protection for drive belt surfaces, preferably at least their gripping or power-transmitting surfaces. Examples of such reinforcements include those based on aliphatic polyamides (for example, nylon) or polyesters as well as those based on aromatic polyamides (for example, aramide) or polyesters. Thus, such surface protection can, for example, be nylon fabric, polyester fabric or a fabric comprising a mixture of both nylon and polyester.

Addition polymers are polymers produced by polymer addition. The most important representatives are polyurethane and polyurea. Polyurethanes are produced by the addition of diisocyanates to polyalcohols, whereas for polyurea, diisocyanates are linked via addition reactions with polyamines.

Drive belts of the kind described above and methods for making them are disclosed in U.S. Pat. No. 6,419,775 and European patent publications 1,088,177 and 0,662,571. In these publications, toothed belts are described which have protective fabric on their teeth. The fabric is provided with a friction-reducing surface coating. The surface coating is a polymer matrix in which polytetrafluoroethylene is embedded. The polymer matrix is a bonding agent matrix of polyurethane, an addition polymer. According to U.S. Pat. No. 6,419,775, an abrasion-resistant composition which is available under the trademark XYLAN® from Whitford Plastics Limited is used as a surface coating. To form the coating, XYLAN® 1642-A-1429 is brought together with XYLAN® 1642-B-1452 and applied to the outer side of the toothed fabric. XYLAN® 1642-A-1429 is a mixture of short and medium chain diols and polyester-polyalcohols with short and medium carbon chains (1-6 C-Atoms) between the polyalcohol components with PTFE in an organic solvent and XYLAN® 1642-B-1452 is a hexamethylenediisocyanate-prepolymer with PTFE in an organic solvent. It has been shown that belts having the surface coating of XYLAN® are significantly improved with respect to wear protection and friction performance; however, these belts can fail prematurely because of tooth shearing when used in very high temperature ranges above 130° C.

SUMMARY OF THE INVENTION

It is an object of the invention to provide drive belts which are characterized by an improved resistance to heat, that is, drive belts having a longer service life when used at high temperatures while at the same time affording good wear resistance.

According to a feature of the invention, in a belt of the above-mentioned type, the elastic addition polymer has less than 2% by weight (based on the polymer) of —O—$C_xR_y$—O— structural components wherein x=1-3 and y=0-6, wherein R is selected from hydrogen and/or carbon-containing groups and wherein R, when more than one is present, can be the same or different.

It has been found that the heat resistance of the belts can be significantly improved when there is a substantial omission or absence of —O—$C_xR_y$—O— groups with x=1-3, which are usually present in the known surface coatings and which groups arise from the reactants for the addition polymer (such as 1,2 propane diol, 1,2 propene diol), ethane diol and polyesterpolyalcohols having short carbon chains of the diol component via the addition of diisocyanate. For operating temperatures of more than 130° C. with peaks up to 170° C., the belts failed significantly later with tooth shearings. However, at the same time, the usual protection against wear for the fabric is retained and therefore the wear protection of the belt via the presence of the surface coating on the outer side of the fabric.

The observed effect can be based on the fact that fission reactions can occur in the addition polymer within the surface coating at especially high temperatures whereby short-chain fragments such as propane diol or ethane diol occur. Apparently because of their polarity, these short-chain fragments have proven to be damaging to the polyamide reinforcement and/or polyester reinforcement of the surface protection so that the reinforcements swell in part thereby causing a loss of strength.

The matrix of at least one elastic addition polymer can, for example, be a polyurethane matrix, polyurea matrix or a mixed matrix of both. The addition polymer is formed from a diisocyanate, for example, 2,4- or 2,6-toluenediisocyanate (TDI), 4,4'-methylene di(phenylisocyanate) (MDI), 4,4'-methylenedicyclohexylisocyanate (HMDI) or hexamethylenediisocyanate (HDI) or a corresponding prepolymer of diisocyanate and a polyalcohol, for example, 1,6-hexane diol, or a polyesterpolyalcohol (for polyurethane) or a polyamine (for polyurea).

It has been shown especially advantageous in view of the heat resistance of the belt when the elastic addition polymer has less than 0.5% by weight, based on the polymer, of structural components —O—$C_xR_y$—O— with x=1-3. This further reduces short-chain diol content and the related damaging of the reinforcement, possibly from thermal decomposition of these diols.

According to an embodiment of the invention, the elastic addition polymer is a polyurethane which is based on polyalcohols having the structure —O—$C_xR_y$—O— with $4 \leq x \leq 20$ and y=0-40, preferably with x=6. The R can be different or equal in a structural component and can be selected from hydrogen and/or carbon-containing groups. Accordingly, polyurethanes containing 1,6-hexane diol can be utilized as the addition polymer.

According to an alternate embodiment of the invention, the elastic addition polymer can also be a polyurea. Short-chain diols which damage the reinforcement are not released by thermal decomposition of the polyurea.

To preclude short-chain polar bonding via thermal decomposition, the elastic addition polymer is preferably a polyurea which is based on polyamines having the structure —$NR^2$—$C_xR^1_y$—$NR^2$— with $x \geq 4$ and $y \geq 0$. The $R^1$ and $R^2$ can be the same or different in a structural component and are selected from hydrogen and/or carbon-containing groups.

The matrix can, however, also be a mixed matrix of polyurethane and polyurea. It is important only that the portion of structural components —O—$C_xR_y$—O— with x=1-3 in the corresponding polymer chains is less than 2% by weight.

The friction-reducing material, which is present in the matrix of the surface coating, can comprise different substances such as graphite, short fibers or fluoropolymers and mixtures thereof. The best results, from the standpoints of optimization of friction and reduction of noise, are obtained with fluoropolymers, preferably polytetrafluoroethylene.

The friction-reducing material is present in the matrix preferably in quantities of 40 to 60% by weight in order to obtain good friction characteristics with good bending capability of the belt and good bonding of the friction-reducing material to the belt.

The surface coating can contain additional substances such as coloring substances, conductive carbon black, thickening agents (for example, cellulose-acetobutyrate) or fillers.

Drive belts according to the invention can, for example, be V-belts or V-ribbed belts having a surface protection on the base or on the ribs of the belt. Preferably, the belts are, however, toothed belts whose teeth have a surface protection with a surface coating on the outer side. In toothed belts, the surface coating of a friction-reducing material in a matrix of at least one elastic addition polymer affords optimal protection of the fabric on the lands between the belt teeth against the teeth of the belt pulley. The fabric on the lands between the teeth of the belt is protected against rubbing through and the adjacent belt teeth remain stable because of the intact fabric. At the same time, the heat resistance of the belt is good because of the low proportion of short-chain structural components —O—$C_xR_y$—O— with x=1-3 in the elastic addition polymer. Premature tooth shearing does not occur and the service life of the belt when operating at high temperatures is significantly increased.

The surface protection on the belt teeth of the toothed belt can contain polyamide reinforcement and/or polyester reinforcement which is usually provided with an adhesion impregnation, for example, an RFL dip, for better adhesion to the rubber of the belt body. Preferably, this is, however, a -6,6-polyamide stretch fabric which can be easily processed in the manufacture of the toothed belt and offers good protection against wear with low noise.

In order to ensure adequate adhesion of the surface protection on the belt body, it has been shown to be advantageous when the surface coating penetrates the surface protection to at most ¾ of the layer thickness of the surface protection, which is usually a fabric.

To provide an especially good protection for land fabric wear, the fabric is provided with 50 to 600 g/m², preferably with 150 to 400 g/m², surface coating in the land regions of the belt teeth of the toothed belt. The weight of the surface coating is based on dry fabric and dry surface coating.

The drive belt according to the invention can be produced by methods known to persons in the field, for example as described in U.S. Pat. No. 6,419,775. The fabric for the surface protection is usually provided with an adhesion impregnation in advance of placement on the belt assembly drum and, thereafter, a paste is applied to the side of the fabric nearest or in contact with the belt rubber. The paste is a vulcanizable rubber mixture in an organic solvent. Thereafter, the opposite side of the fabric, which can form the outer side of the belt, receives a layer of paste which contains the friction-reducing material and the adducts of the elastic addition polymer, which form the matrix, in organic solvent, for example, in 50% xylene. After drying, the fabric is utilized in the usual manner when building the belt winding. The resultant material is vulcanized and is cut to the desired width.

BRIEF DESCRIPTION OF THE DRAWINGS

The invention will now be described with reference to the drawing wherein the single figure (FIG. 1) shows a schematic of the cross section of the drive belt according to an embodiment of the invention.

DESCRIPTION OF A PREFERRED EMBODIMENT OF THE INVENTION

Figure 1:
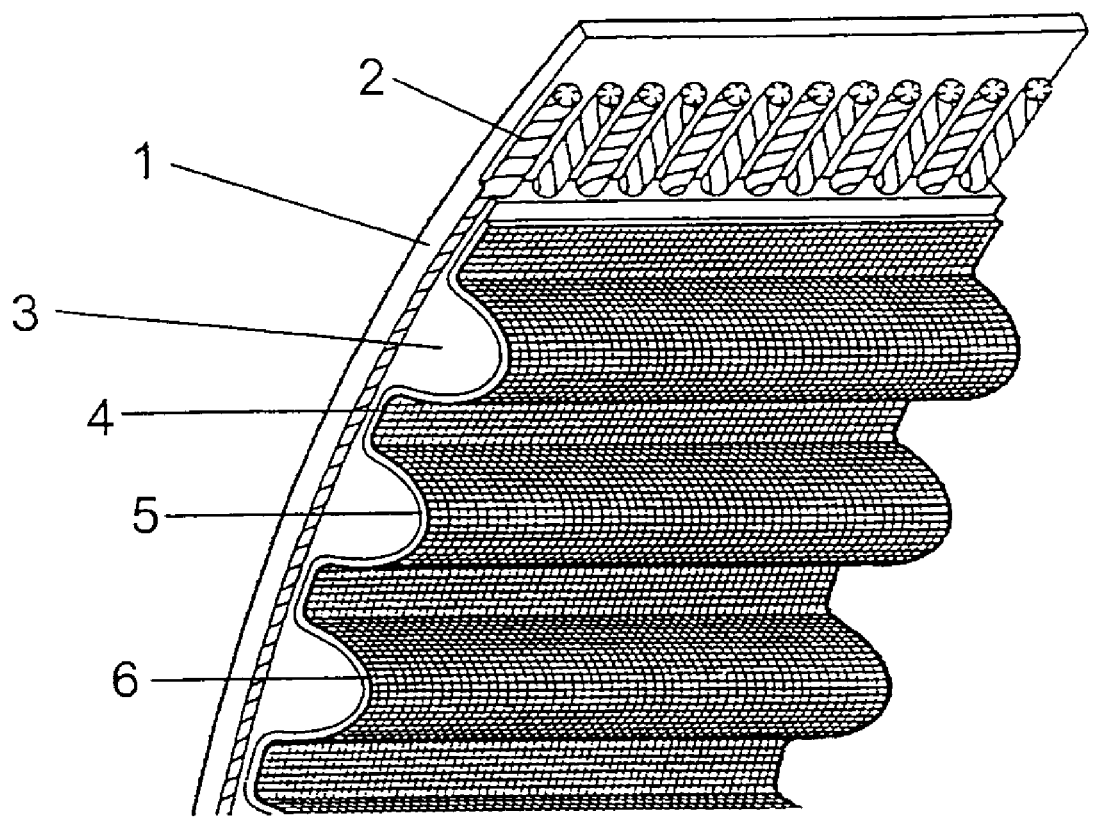

In FIG. 1, a drive belt according to the invention is shown schematically in the form of a toothed belt. The toothed belt has an elastomer cover layer 1, a tension carrier layer 2 of parallel running reinforcement cords and belt teeth 3 of elastomer material having teeth lands 4 lying therebetween. The toothed side of the belt, that is, the belt teeth 3 and the teeth lands 4 are provided with surface protection in the form of fabric 5. The outer side of the fabric surface protection 5 has a surface coating in the form of layer 6.

Three toothed belts were produced based on an HNBR rubber body and teeth, a tension carrier layer of glass cords in the body and a -6,6-polyamide stretch fabric on the teeth. The tooth fabric was, in all cases, coated with an RFL dip on the basis of CSM. Then, the fabric was dipped with an adhesive agent, a so-called overcoat, and was coated on the rubber side with a paste of HNBR rubber mixture in organic solvent. However, treatment of the opposite side of the fabric, referred to as the "tooth side", differed among the three belts. After the drying of all coatings applied to the fabric, the fabric was utilized in the building of belts in the usual manner.

In comparison belt A, no further coating was applied to the fabric tooth side.

To the tooth side of comparison belt B was applied XYLAN® (product of XYLAN® 1642-A-1429 and XYLAN® 1642-B-1452) of Whitford Plastics Limited. In addition to PTFE powder (approximately 25% by weight) and a solvent mixture (approximately 50% by weight), the XYLAN® comprises the polyurethane-forming components diisocyanate and a mixture of short-chain diols and medium-chain diols, essentially 1,2-propane diol, ethane diol and 1,6-hexane diol, and polyesterpolyalcohols having short and medium —O—$C_xR_y$—O— components.

In the third belt C, representing an example of the invention, the fabric tooth side was treated with a XYLAN analog mixture which, with respect to the components and concentrations other than the diol components and the polyalcohol components, was made up in the same way. The mixture of short-chain and medium-chain diols and polyesterpolyalcohols having short and medium —O—$C_xR_y$—O— components was replaced by pure 1,6-hexane diol and polyesterpolyalcohol with the component —O—$C_6H_{12}$—O—.

The three belts were investigated with respect to their service life at a very high operating temperature (170° C.) and with respect to the land fabric wear at room temperature. For the service life determination at very high temperatures, the belts were tested on an electrical drag component test stand at 170° C. ambient temperature and 4,000 rpm. For the land fabric wear, the belts were tested on the same test stand at room temperature at a rotation frequency at which the highest belt tension forces occur. The forces which act on the belt were drastically increased because of the variation of the rotation frequency and the lands of the belt were intensely loaded thereby. Table 1 shows the results of the investigations.

TABLE 1

|  | Belt A | Belt B | Belt C |
|---|---|---|---|
| Running Time until Failure because of Tooth Shear | 70 h | 50 h | 67 h |
| Average Running Time at RT until a clear wear Indication occurs at the Lands | 90 h | 330 h | 330 h |

From Table 1, it is evident that a long service life at high operating temperatures can be reached only with the surface coating without the short-chain component —O—$C_xR_y$—O— with x=1-3 and y=0-6 without the land fabric wear becoming unacceptable.

In addition, the fabric prepared for making the belts was investigated. The fabric for belts B and C was stored for three days at 150° C. and 170° C. and their elongation at break (tension investigation according to DIN EN ISO 13934-1) was determined in the weft direction at room temperature. The results are shown in Table 2.

TABLE 2

|  | Fabric B | Fabric C |
|---|---|---|
| Elongation at Break, 3 Days, 150° C. | 97% | 152% |
| Elongation at Break, 3 Days, 170° C. | 8% | 98% |

The fabric C shows the high elongation at break, which is desired in the belts, even after exposure to high temperatures; whereas, fabric B becomes clearly embrittled at high temperatures in the presence of the XYLAN coating and does not exhibit adequate strength for stabilizing the belt teeth.

It is understood that the foregoing description is that of the preferred embodiments of the invention and that various changes and modifications may be made thereto without departing from the spirit and scope of the invention as defined in the appended claims.

What is claimed is:

1. Drive belt of rubber or plastic having, at a surface thereof, protective textile reinforcement which contains polyamide and/or polyester, and, at the outer side of the textile reinforcement, a coating comprising friction-reducing material in a matrix of at least one elastic addition polymer, wherein the elastic addition polymer has less than 2% by weight, based on the polymer, of —O—$C_xR_y$—O— structural components wherein x =1-3, y=0-6 and R is selected from hydrogen and carbon-containing groups.

2. Drive belt of claim 1, wherein the elastic addition polymer has less than 0.5% by weight, based on the polymer, of structural components —O—$C_xR_y$—O— when x =1-3.

3. Drive belt of claim 1 or 2, wherein the elastic addition polymer is a polyurethane which is based on polyalcohols having the structure —O—$C_xR_y$—O— wherein $4 \leq x \leq 20$, y=040 and R is selected from hydrogen and carbon-containing groups.

4. Drive belt of claim 3, wherein the elastic addition polymer is a polyurethane which is based on polyalcohols having the structure —O—$C_xR_y$—O— wherein x=6.

5. Drive belt of claim 1 or 2, wherein the elastic addition polymer is a polyurea.

6. Drive belt of claim 5, wherein the elastic addition polymer is a polyurea which is based on polyamines having the structure —$NR^2$—$C_xR^1_y$—$NR^2$— with $x \leq 4$ and $y \leq 0$ and the $R^1$ and $R^2$ can be the same or different in a structural component and are selected from hydrogen and/or carbon-containing groups.

7. Drive belt of claim 1 or 2, wherein the matrix of at least one elastic addition polymer contains polyurethane and polyurea.

8. Drive belt of claim 1, wherein the friction-reducing material is a fluoropolymer powder.

9. Drive belt of claim 8, wherein the fluoropolymer is polytetrafluoroethylene.

10. Drive belt of claim 1, wherein the friction-reducing material is present in the matrix in quantities of 40 to 60% by weight.

11. Drive belt of claim 1, wherein the belt is a rubber toothed belt.

12. Drive belt of claim 11, wherein the surface protective textile reinforcement is a -6,6-polyamide stretch fabric on the belt teeth.

13. Drive belt of claim 12, wherein the fabric in the land region of the belt teeth is provided with 50 to 600 g/m² of surface coating.

14. Drive belt of claim 12, wherein the fabric in the land region of the belt teeth is provided with 150 to 400 g/m² of surface coating.

* * * * *

UNITED STATES PATENT AND TRADEMARK OFFICE
CERTIFICATE OF CORRECTION

PATENT NO. : 7,946,940 B2
APPLICATION NO. : 11/704308
DATED : May 24, 2011
INVENTOR(S) : Henning Kanzow et al.

Page 1 of 1

It is certified that error appears in the above-identified patent and that said Letters Patent is hereby corrected as shown below:

In column 6:
Line 10: delete "y=040" and substitute -- y=0-40 -- therefor.

In column 6:
Line 19: delete "x≤4 and y≤0" and substitute -- $x \geq 4$ and $y \geq 0$ -- therefor.

Signed and Sealed this
Fifth Day of July, 2011

David J. Kappos
*Director of the United States Patent and Trademark Office*